United States Patent
Sun et al.

(10) Patent No.: US 12,101,645 B2
(45) Date of Patent: Sep. 24, 2024

(54) APPARATUS AND METHOD FOR GROUP BASED REPORTING BEAM MANAGEMENT

(71) Applicant: Apple Inc., Cupertino, CA (US)

(72) Inventors: Haitong Sun, Cupertino, CA (US);
Chunhai Yao, Beijing (CN); Chunxuan Ye, San Diego, CA (US); Dawei Zhang, Saratoga, CA (US); Hong He, San Jose, CA (US); Jia Tang, San Jose, CA (US); Oghenekome Oteri, San Diego, CA (US); Pengkai Zhao, Cupertino, CA (US); Tianyan Pu, Cupertino, CA (US); Wei Zeng, Saratoga, CA (US); Wei Zhang, Santa Clara, CA (US); Weidong Yang, San Diego, CA (US); Yeong-Sun Hwang, Germering (DE); Yuchul Kim, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,683

(22) PCT Filed: Apr. 8, 2020

(86) PCT No.: PCT/CN2020/083757
§ 371 (c)(1),
(2) Date: Sep. 21, 2021

(87) PCT Pub. No.: WO2021/203295
PCT Pub. Date: Oct. 14, 2021

(65) Prior Publication Data
US 2023/0025057 A1    Jan. 26, 2023

(51) Int. Cl.
*H04W 16/28*    (2009.01)
*H04B 17/336*    (2015.01)
(Continued)

(52) U.S. Cl.
CPC .......... *H04W 16/28* (2013.01); *H04B 17/336* (2015.01); *H04W 24/10* (2013.01); *H04W 52/365* (2013.01)

(58) Field of Classification Search
CPC ... H04W 16/28; H04W 24/10; H04W 52/365; H04B 17/336
See application file for complete search history.

(56) References Cited

U.S. PATENT DOCUMENTS 11,025,328 B2   6/2021   Gao et al.
2019/0306924 A1* 10/2019  Zhang .................... H04B 7/063
(Continued)

FOREIGN PATENT DOCUMENTS

CN              108631841 A      10/2018
WO       WO 2019/029702 A1      2/2019
WO       WO 2019165239 A1       8/2019

OTHER PUBLICATIONS

International Search Report and Written Opinion of the International Searching Authority directed to related International Patent Application No. PCT/CN2020/083757, dated Dec. 31, 2020; 8 pages.

(Continued)

*Primary Examiner* — Fahmida S Chowdhury
(74) *Attorney, Agent, or Firm* — Sterne, Kessler, Goldstein & Fox P.L.L.C.

(57) ABSTRACT

Some embodiments include an apparatus, method, and computer program product for using group based reporting for beam management in a 5G wireless communications system. A user equipment (UE) can determine based on a signal-to-interference-plus noise ratio (SINR) or reference signal received power (RSRP) measurement, a ranking of two or more beam combinations, and transmit the ranking to a 5G node B (gNB). The UE can receive from the gNB, a transmission configuration indicator (TCI) codepoint that (Continued)

identifies a combination of two or more beams, where the TCI codepoint is based at least on the ranking. The UE can receive simultaneous transmissions via the combination, and transmit a report to the gNB that identifies by the TCI codepoint, SINRs that corresponds to the combination. In some embodiments the UE can simultaneously transmit on a second combination identified by a sounding reference signal (SRS) resource indicator (SRI) codepoint.

20 Claims, 9 Drawing Sheets

(51) Int. Cl.
  *H04W 24/10* (2009.01)
  *H04W 52/36* (2009.01)

(56) References Cited

U.S. PATENT DOCUMENTS

| | | | | |
|---|---|---|---|---|
| 2020/0007208 | A1* | 1/2020 | Zhou | H04B 7/0634 |
| 2020/0068462 | A1* | 2/2020 | Zetterberg | H04W 36/0058 |
| 2021/0058930 | A1* | 2/2021 | Zhou | H04B 7/0695 |
| 2021/0194658 | A1* | 6/2021 | Venugopal | H04W 76/27 |
| 2022/0116979 | A1* | 4/2022 | Park | H04L 5/0044 |
| 2022/0166468 | A1* | 5/2022 | Go | H04B 7/0456 |
| 2022/0174609 | A1* | 6/2022 | Kang | H04W 52/42 |
| 2022/0337300 | A1* | 10/2022 | Yuk | H04L 5/0092 |
| 2023/0093264 | A1* | 3/2023 | Gao | H04L 5/0092 370/329 |

OTHER PUBLICATIONS

3GPP, "Enhancements on multi-TRP and multi-panel transmission," R1-1912861, Nov. 22, 2019, accessed at https://www.3gpp.org/DynaReport/TDocExMtg--R1-99--32827.htm.

OPPO, "Remaining Issues on Multi-beam Operation Enhancement" 3GPP TSG RAN WG1 #100, R1-2000458, e-Meeting, Feb. 24-Mar. 6, 2020, 8 pages.

ZTE, "Maintenance of enhancements on multi-TRP transmissiom" 3GPP TSG RAN WG1 Meeting #100-e, R1-2000239, e-Meeting, Feb. 24-Mar. 6, 2020, 12 pages.

Decision to Grant, dated Oct. 19, 2023, for Japanese Patent Appl. No. 2022-559991, 2 pages.

Extended European Search Report directed to related European Application No. 20930610.9, mailed Oct. 13, 2023; 10 pages.

Vivo, "Discussion on beam measurement, beam reporting and beam indication," 3GPP TSG RAN WG1 Meeting #90bis, Praque, CZ, Oct. 9-13, 2017, R1-1717472; 12 pages.

First Office Action and Search Report directed to related Chinese Application No. 202080099465.0, with English-language machine translation, mailed Jul. 30, 2024; 18 pages.

* cited by examiner

R: Reserved bit
Serving Cell ID: 5 bits
BWP ID: 2 bits, Band Width Party (BWP) ID
Bit Map
  1 in each TCI/SRI codepoint: activated,
  0 in each TCI/SRI codepoint: deactivated,

|   | 7 | 6 | 5 | 4 | 3 | 2 | 1 | 0 |
|---|---|---|---|---|---|---|---|---|
|   | R | \multicolumn{5}{c}{Serving Cell ID 715} | | | BWP ID 720 |

| | | | | | |
|---|---|---|---|---|---|
| R | R | Number of SRI Codepoints (M) 730 | Number of SRI Codepoings with 2 SRIs (# non zero C_i) 740 | | |
| C_0 | | SRI (0,1) | | | 750 |
| R | | SRI (0,2) | | | 760 |
| | | ... | | | |
| C_M | | SRI (M-1,1) | | | 770 |
| R | | SRI (M-1,2) | | | 780 |

R: Reserved bit
Serving Cell ID: 5 bits
BWP ID: 2 bits, Band Width Party (BWP) ID
C_I: whether the corresponding SRI codepoint contains 2 SRIs

FIG. 7

```
beamSwtichTiming        SEQUENCE {
    scs-60kHz               ENUMERATED {sym14, sym28, sym48, sym224, sym336}
    scs-120kHz              ENUMERATED {sym14, sym28, sym48, sym224, sym336}
    ..
}
```

```
timeDurationForQCL      SEQUENCE {
    scs-60kHz               ENUMERATED {s7, s14, s28}
    scs-120kHz              ENUMERATED {s14, s28}
    ..
}
```

FIG. 9

APPARATUS AND METHOD FOR GROUP BASED REPORTING BEAM MANAGEMENT

This application is a U.S. National Phase of International Application No. PCT/CN2020/083757, filed Apr. 8, 2020, which is hereby incorporated by reference in its entirety.

BACKGROUND

Field

The described embodiments relate generally to 5G wireless communications.

Related Art 5G wireless communications systems include a user equipment (UE) supporting simultaneous reception over multiple beams as well as simultaneous uplink (UL) transmission over multiple beams to a 5G node B (gNB).

SUMMARY

Some embodiments include an apparatus, method, and computer program product for group based reporting beam management. Some embodiments include a user equipment (UE), that includes a transceiver and a processor, coupled to the transceiver. The processor can determine a signal-to-interference-plus noise ratio (SINR) measurement or a reference signal received power (RSRP) measurement per beam of a plurality of beams from which the UE can simultaneously receive downlink (DL) transmissions, and rank based at least on the determined SINR measurements or the RSRP measurements, a first combination of two or more beams with a second combination of two or more beams of the plurality of beams. The processor can transmit, to a 5G node B (gNB) via the transceiver, the determined ranking of the plurality of beams from which the UE can simultaneously receive DL transmissions. Based at least on the ranking, the processor can receive via the transceiver, a transmission configuration indicator (TCI) codepoint that corresponds to two or more beams from which the UE can simultaneously receive DL transmissions, where a beam of the two or more beams is identified by a channel-state information (CSI) resource indicator (CRI), a synchronization signal block resource indicator (SSBRI), or a sounding reference signal (SRS) resource indicator (SRI). The processor can simultaneously receive, via the transceiver, the two or more beams identified by the TCI codepoint, and transmit, via the transceiver, a group beam report corresponding to the simultaneous reception, including the TCI codepoint and a SINR measurement per beam of the two or more beams.

The processor supports differential encoding that reduces the number of bits used to encode the group beam report measurements. For example, the processor can quantize a first SINR measurement of the SINR measurements of the two or more beams as a reference measurement using X bits, where X is an integer, and quantize remaining SINR measurements of the two or more beams using Y bits, where Y is an integer less than X. In some embodiments the reference measurement is larger than other measurements in the group beam report, and the reference measurement is identified by a location within the group beam report.

The processor can determine that the UE supports simultaneous uplink (UL) transmissions, and transmit the group beam report that include an indication of whether the UE supports simultaneous UL transmissions on the two or more beams corresponding to the TCI codepoint. The processor can transmit, to the gNB via the transceiver, a second indication of two or more sounding reference signals (SRSs) over which the UE can simultaneously transmit UL transmissions, where the second indication comprises: Physical Uplink Control Channel (PUCCH) signaling, Physical Random Access Channel (PRACH) signaling, Radio Resource Control (RRC) signaling, or Media Access Control (MAC) Control Element (CE) signaling. Based at least on the second indication, the processor can receive via the transceiver, an SRS resource indicator (SRI) codepoint that identifies a spatial relationship with two or more SRIs over which the UE can simultaneously transmit UL transmissions.

The processor can transmit to the gNB via the transceiver, simultaneous UL transmissions via the two or more beams corresponding to the TCI codepoint, where a first beam of the two or more beams corresponds to a first group of SRS resources and a second beam of the two or more beams corresponds to a second group of SRS resources. The processor can transmit, to the gNB via the transceiver, a second indication that the UE is not transmitting simultaneous UL transmissions on the two or more beams corresponding to the TCI codepoint.

In some embodiments, a first group beam report is used for simultaneous DL reception and a separate second group beam report is used for simultaneous UL transmission. When a separate second group beam report is implemented, the processor can simultaneously transmit UL transmissions on the two or more beams corresponding to the TCI codepoint, and the processor can transmit, to the gNB via the transceiver, a second group beam report that comprises: a power headroom (PHR) value.

The UE also includes an antenna, coupled to the transceiver, that includes two or more panels. The processor can transmit, to the gNB via the transceiver, an indication that the UE is not receiving simultaneous DL transmissions on the two or more beams corresponding to the TCI codepoint, and place a panel of the two or more panels corresponding to a beam of the two or more beams in a dormant state. The indication can include PUCCH signaling, PRACH signaling, RRC signaling, or MAC-CE signaling.

The processor can transmit, via the transceiver, report capabilities comprising beam switch timing delays (e.g., at power up), and subsequent to placing the panel of the two or more panels in the dormant state, re-activate the panel according to a largest beam switch timing delay of the beam switch timing delays. The processor can receive via the transceiver and the panel, a time domain multiplexed (TDM) signal corresponding to the panel.

Some embodiments include a method for a UE that includes transmitting, to a gNB a ranking of a plurality of beams from which the UE can simultaneously receive DL transmissions. Based at least on the ranking, receiving a first TCI codepoint that corresponds to a first set of two or more beams from which the UE can simultaneously receive DL transmissions, and a second TCI codepoint that corresponds to a second set of two or more beams from which the UE can simultaneously transmit UL transmissions. Some embodiments include simultaneously receiving DL transmissions from the first set of two or more beams identified by the TCI codepoint, simultaneously transmitting UL transmissions via the second set of two or more beams identified by the second TCI codepoint, where the TCI codepoint is different than the second TCI codepoint, and transmitting a group beam report corresponding to the simultaneous reception, comprising the TCI codepoint and a SINR measurement per beam of the first set of two or more beams.

Some embodiments are directed to a gNB that includes a transceiver and a processor, coupled to the transceiver. The processor can receive, from a UE via the transceiver, a ranking of a plurality of beams from which the UE can simultaneously receive DL transmissions. Based at least on the ranking, the processor can transmit via the transceiver, a first TCI codepoint that corresponds to a first set of two or more beams from which the UE can simultaneously receive DL transmissions, where a beam of the first set two or more beams is identified by a CRI, a SSBRI, or a SRI. The processor can transmit, via the transceiver, the first set of two or more beams identified by the first TCI codepoint, and receive, via the transceiver, a group beam report corresponding to a simultaneous reception by the UE of the first set of two or more beams comprising the first TCI codepoint and a SINR measurement per beam of the first set of two or more beams. The ranking is based at least on a SINR measurement or a RSRP measurement of the plurality of beams.

The processor can process the group beam report that includes a reference measurement that includes a quantized first SINR measurement of the SINR measurements of the first set of two or more beams using X bits, where X is an integer, and remaining SINR measurements of the first set of two or more beams quantized using Y bits, where Y is an integer less than X. The reference measurement can be larger than other measurements in the group beam report, and/or the reference measurement can be identified by a location within the group beam report. In some embodiments the group beam report indicates that the UE can simultaneously transmit UL transmissions via a second set of two or more beams corresponding to a second TCI codepoint, and the second TCI codepoint can be different than the first TCI codepoint. The processor can receive from the UE via the transceiver, an indication that the UE is not receiving simultaneous DL transmissions on the first set of two or more beams corresponding to the TCI codepoint, where the indication comprises: PUCCH signaling, PRACH signaling, RRC signaling, or MAC- CE signaling.

The processor can receive, via the transceiver, report capabilities including beam switch timing delays, and subsequent to receiving the indication, transmit via the transceiver, a TDM signal corresponding a beam of the first set of two or more beams according to a largest beam switch timing delay of the beam switch timing delays.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 7 illustrates an example MAC-CE indication of Sounding Reference Signal (SRS) Resource Indicator (SRI) codepoints, according to some embodiments of the disclosure.

FIG. 9 illustrates an example of beam switch timing delays, according to some embodiments of the disclosure.

Figure 1:
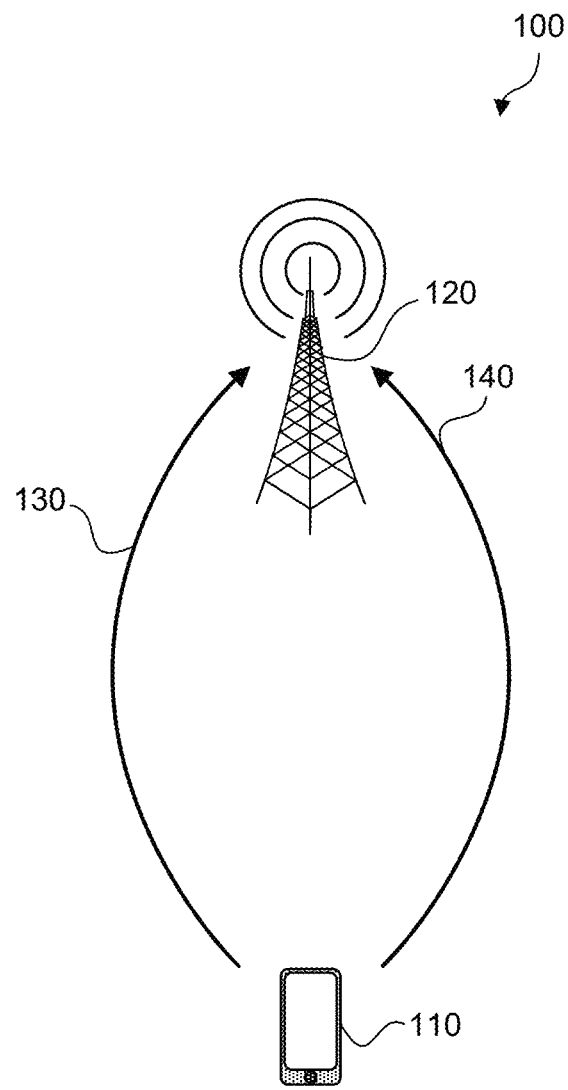
FIG. 1 illustrates an example system for group based reporting beam management, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

A 5G wireless communications system can include a user equipment (UE) that simultaneously receives downlink (DL) transmissions over multiple beams from a 5G node B (gNB), and simultaneously transmits uplink (UL) transmissions over multiple beams to the gNB. Group based reporting is an indirect indication of whether a UE supports simultaneous reception over multiple beams. Some embodiments herein include an apparatus, method, and computer program product for group based reporting for beam management in a 5G wireless communications system. For example, some embodiments include layer 1 signal-to-interference-plus noise ratio (SINR) measurements in the group based reports, and define ranking criteria for a UE to identify combinations of beams to be used for simultaneous reception and/or simultaneous transmission. Some embodiments include separate beam reporting for simultaneous reception from a first set of multiple beams and simultaneous transmission over a second set multiple beams where the first and second set may be different. Some embodiments include differential encoding with a reference measurement that can include fewer quantization bits for the remaining measurements in a group based report. Some embodiments enable a UE to temporarily turn off simultaneous reception and/or simultaneous transmission and can include UL SRS support for simultaneous UL transmissions.

FIG. 1 illustrates an example system 100 for group based reporting beam management, in accordance with some embodiments of the disclosure. System 100 includes UE 110, gNB 120, UL transmissions 130, and DL transmissions 140. UE 110 can be a computing electronic device such as a smart phone, cellular phone, and for simplicity purposes— may include other computing devices including but not limited to laptops, desktops, tablets, personal assistants, routers, monitors, televisions, printers, and appliances. A UE can report at least the following via UL transmissions 130 to a gNB: combinations of beams over which the UE can receive simultaneous DL transmissions; combinations of beams over which the UE can transmit simultaneous UL transmissions to the gNB; a temporary reduction in capabilities for simultaneous reception of DL transmissions according to a transmission configuration indicator (TCI) codepoint; and/or a temporary reduction in capabilities for simultaneous transmission of UL transmissions according to a Sounding Reference Signal (SRS) Reference Indicator (SRI) codepoint.

As illustrated, gNB 120 can be a 5G base station. GNB 120 can configure and transmit the following via DL transmission 140 to UE 110: downlink (DL) beam TCI codepoints for a Physical Downlink Shared Channel (PDSCH) shared with UE 110; UL beam SRI codepoints for a Physical Uplink Shared Channel (PUSCH); and UL SRS beam and resources configuration.

Figure 2:
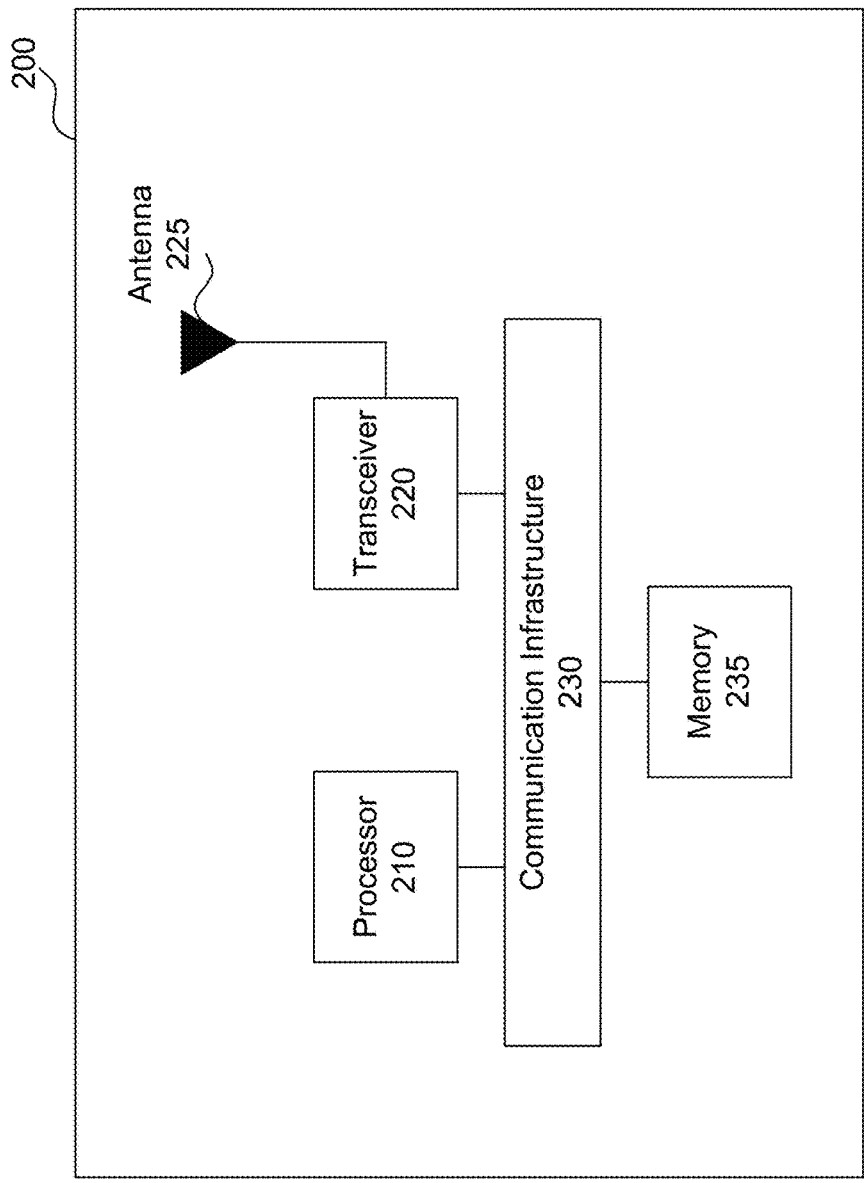
FIG. 2 illustrates a block diagram of an example wireless system for group based reporting beam management, according to some embodiments of the disclosure.

FIG. 2 illustrates a block diagram of an example wireless system 200 for group based reporting beam management, according to some embodiments of the disclosure. As a convenience and not a limitation, system 200, may be described with elements of FIG. 1. System 200 can be UE 110 or gNB 120 of FIG. 1. System 200 may include processor 210, transceiver 220, communication infrastructure 230, memory 235, and antenna 225 that together perform operations enabling group based reporting beam management. Transceiver 220 transmits and receives 5G wireless communications signals via antenna 225. Communication infrastructure 230 may be a bus. Memory 235 may include random access memory (RAM) and/or cache, and may include control logic (e.g., computer software), computer instructions, and/or data. Processor 210, upon execution of the computer instructions, can be configured to perform the functionality described herein for group based reporting beam management. Alternatively, processor 210 can include its own internal memory (not shown), and/or be "hard-wired" (as in a state-machine) configured to perform the functionality described herein for group based reporting beam management. Antenna 225 coupled to transceiver 220, may include one or more antennas and/or panels (not shown) that may be the same or different types to enable wireless communication over a wireless network.

Figure 3:
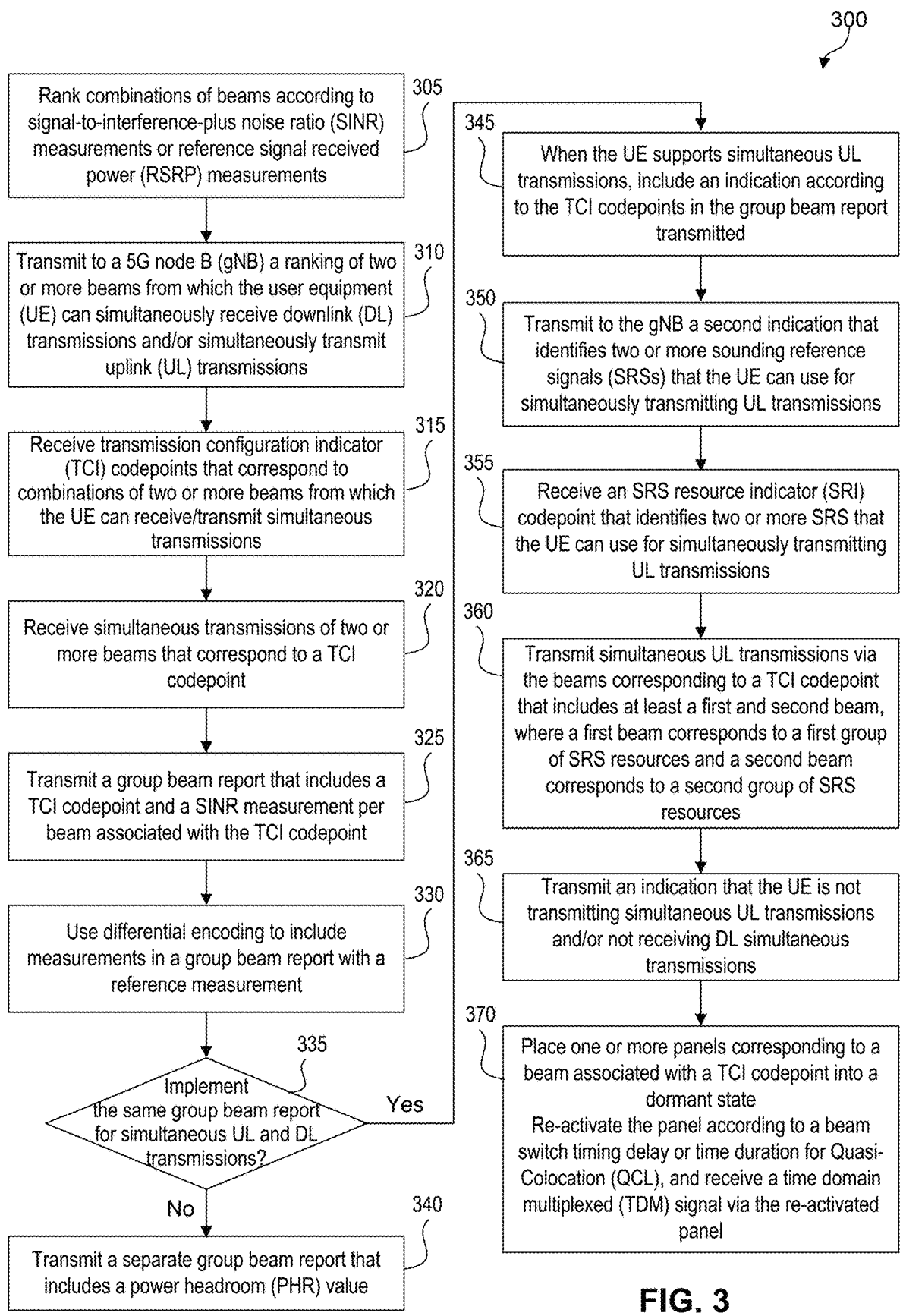
FIG. 3 illustrates a method for an example user equipment (UE) for group based reporting beam management, according to some embodiments of the disclosure.

FIG. 3 illustrates a method 300 for an example user equipment (UE) for group based reporting beam management, according to some embodiments of the disclosure. As a convenience and not a limitation, FIG. 3, may be described with elements of FIGS. 1 and/or 2. For example, method 300 may be performed by UE 110 of FIG. 1 or system 200 of FIG. 2.

At 305, system 200 can rank combinations of beams according to SINR) measurements or reference signal received power (RSRP) measurements. For example, UE 110 can measure signals of received beams, and rank combinations of the beams (e.g., two or more beams). While examples describe a pair of beams, a person of ordinary skill in the art (POSA) would understand that the combinations can include two or more beams. The ranking of each pair can be based on a weaker or stronger SINR measurement within a pair, or the weaker or stronger RSRP measurement within a pair. If a weaker or stronger SINR is used for example, and some pairs have a same value of the weaker SINR, then the stronger or weaker RSRP measurements corresponding to each pair can be used to break the tie.

In some embodiments the sum of SINR measurements or sum of RSRP measurements can be used as the basis for ranking the pairs. A pair of beams whose sum of SINR measurements have a highest SINR sum compared to other pairs of beams can be considered the first pair (e.g., most desirable combination), or a pair of beams whose sum of RSRP measurements have a highest RSRP measurement sum compared to other pairs of beams can be considered the first pair (e.g., most desirable combination.) In the event two pairs of beams have a same SINR sum, the pair with a higher RSRP measurement can break the tie, or the pair with a higher RSRP sum can break the tie. In some embodiments, the ranking of the pairs can be based on a sum of effective spectral efficiency: $\log(1+SINR1)+\log2(1+SINR2)$. In the event of a tie, the pair with a stronger SINR or stronger RSRP can be used to break the tie. A POSA would understand that other combinations are possible.

At 310, system 200 can transmit to a 5G node B (gNB) a ranking of two or more beams from which the user equipment (UE) can simultaneously receive DL transmissions and/or simultaneously transmit UL transmissions.

At 315, system 200 can receive TCI codepoints that correspond to combinations of two or more beams over which the UE can receive simultaneous DL transmissions and/or transmit simultaneous UL transmissions. For example, the TCI codepoints can be used in a TCI codepoint table to indicate two or more beams used for spatial relationship configuration, for PDSCH for example. Table 1 below illustrates an example of a TCI codepoint table with 4 code points. Each codepoint (row) identifies two or more beams. In this example, there are two beams per codepoint. A beam can be identified by a channel-state information (CSI) Resource Indicator (CRI) or a synchronization signal block resource indicator (SSBRI). In an example, a codepoint can be identified by 3 bits.

TABLE 1

| TCI Codepoint Table | | |
| --- | --- | --- |
| TCI Codepoint | Beam 1 Identification | Beam 2 Identification |
| Codepoint #1 | CRI or SSBRI #1_1 | CRI or SSBRI #1_2 |
| Codepoint #2 | CRI or SSBRI #2_1 | CRI or SSBRI #2_2 |
| Codepoint #3 | CRI or SSBRI #3_1 | CRI or SSBRI #3_2 |
| Codepoint #4 | CRI or SSBRI #4_1 | CRI or SSBRI #4_2 |

At 320, system 200 can receive simultaneous DL transmissions of two or more beams that correspond to a TCI codepoint from gNB 120. For example, UE 110 can receive simultaneous DL transmissions from the two beams associated with codepoint #1.

At 325, system 200 can transmit a group beam report that includes a TCI codepoint and a SINR measurement per beam associated with the TCI codepoint. An example of a group beam report for the downlink simultaneous received beams is shown in Table 2. In this example, UE 110 simultaneously received DL transmissions from beams identified by codepoint #1, codepoint #2, codepoint #3 and codepoint #4. For codepoint #1, for example, two SINR measurements are identified: SINR #1_1 and Differential SINR #1_2. (The differential encoding is described at 330 below.) Each codepoint has a SINR measurement that corresponds to each beam. In this example there are two beams, but more than two beams are possible.

TABLE 2

| TCI Codepoint Table with SINR Measurements | | |
| --- | --- | --- |
| TCI Codepoint | Beam 1 Identification | Beam 2 Identification |
| Codepoint #1 | CRI or SSBRI #1_1 | CRI or SSBRI #1_2 |
| Codepoint #2 | CRI or SSBRI #2_1 | CRI or SSBRI #2_2 |
| Codepoint #3 | CRI or SSBRI #3_1 | CRI or SSBRI #3_2 |
| Codepoint #4 | CRI or SSBRI #4_1 | CRI or SSBRI #4_2 |

TABLE 2-continued

TCI Codepoint Table with SINR Measurements

| TCI Codepoint | Beam 1 Identification | Beam 2 Identification |
|---|---|---|
| | SINR #1_1 | Differential SINR #1_2 |
| | (Differential) SINR #2_1 | Differential SINR #2_2 |
| | (Differential) SINR #3_1 | Differential SINR #3_2 |
| | (Differential) SINR #4_1 | Differential SINR #4_2 |

In some embodiments, RSRP measurements may be transmitted in the group beam report for the downlink simultaneous received beams as shown in Table 3.

TABLE 3

TCI Codepoint Table with RSRP Measurements

| TCI Codepoint | Beam 1 Identification | Beam 2 Identification |
|---|---|---|
| Codepoint #1 | CRI or SSBRI #1_1 | CRI or SSBRI #1_2 |
| Codepoint #2 | CRI or SSBRI #2_1 | CRI or SSBRI #2_2 |
| Codepoint #3 | CRI or SSBRI #3_1 | CRI or SSBRI #3_2 |
| Codepoint #4 | CRI or SSBRI #4_1 | CRI or SSBRI #4_2 |
| | RSRP #1_1 | Differential RSRP #1_2 |
| | (Differential) RSRP #2_1 | Differential RSRP #2_2 |
| | (Differential) RSRP #3_1 | Differential RSRP #3_2 |
| | (Differential) RSRP #4_1 | Differential RSRP #4_2 |

In some embodiments, the measurements may include SINR and RSRP measurements or a combination thereof.

At 330, system 200 can use differential encoding to include measurements in a group beam report with a reference measurement. Differential encoding can result in less bits being used to transmit the group based report. As shown in Table 2, for a group based report with layer 1(L1)-SINR, differential encoding may be used. A reference measurement L1-SINR (e.g., SINR #1_1) is quantized with 7 bits with a 0.5 dB step size between [−23 to 40]dB range. The remaining 7 L1-SINR measurements are differential from the reference measurement and are quantized with less than 7 bits (e.g., 4 bits and 1 dB step size.) A reserved bit can be used if any of the remaining 7 L2-SINR measurements differ from the reference measurement by more than 14 dB.

In some embodiments, the reference measurement can be interpreted or considered to be the strongest measurement (e.g., SINR #1_1 of Table 2; RSRP #1_1 of Table 3) and/or the reference measurement can be determined by its location (e.g., placement) within the table. The measurements can decrease in the table from left to right and top to bottom in Table 2 and Table 3. For each codepoint row, the first SINR or RSRP value can be larger than the subsequent beam to the right. In some embodiments the reference measurement is a largest SINR or RSRP in the group beam report. In some embodiments the reference measurement is the larger SINR or RSRP measurement in each codepoint row. The reference measurement may vary based on the ranking method implemented by UE 110 (e.g., at 305.)

At 335, system 200 determines whether to implement the same group beam report for reporting simultaneous reception of DL transmissions over multiple beams and for indicating simultaneous transmission of UL transmissions over multiple beams where the multiple beams can be the same or different. When the same group beam report is used, method 300 proceeds to 345. Otherwise, method 300 proceeds to 340.

At 340, system 200 can transmit a separate group beam report that includes a power headroom (PHR) value. An example of a second group beam reporting UL report is shown in Table 4. A value in the power headroom column indicates that UE 110 can also simultaneously transmit UL transmissions, for example on the beams corresponding to codepoint #1, codepoint #2, and codepoint #4. In this example, UE 110 does not simultaneously transmit UL transmissions on the beams corresponding to codepoint #3.

TABLE 4

Separate Group Beam Report Uplink

| TCI Codepoint | Beam 1 Identification | Beam 2 Identification | Power Headroom |
|---|---|---|---|
| Codepoint #1 | CRI or SSBRI #1_1 | CRI or SSBRI #1_2 | PHR#1 |
| Codepoint #2 | CRI or SSBRI #2_1 | CRI or SSBRI #2_2 | PHR#2 |
| Codepoint #3 | CRI or SSBRI #3_1 | CRI or SSBRI #3_2 | — |
| Codepoint #4 | CRI or SSBRI #4_1 | CRI or SSBRI #4_2 | PHR#4 |

As an example, UE 110 can estimate a path loss or propagation loss of a simultaneous received DL beams corresponding to codepoint #2, compare with an allowed value set by gNB 120, and indicate the difference in the PHR column. In some embodiments, a PHR value can be reported per beam as shown below in Table 5 below.

TABLE 5

Another Separate Group Beam Report Uplink

| TCI Codepoint | Beam 1 Identification | Beam 2 Identification |
|---|---|---|
| Codepoint #1 | CRI or SSBRI #1_1 | CRI or SSBRI #1_2 |
| Codepoint #2 | CRI or SSBRI #2_1 | CRI or SSBRI #2_2 |
| Codepoint #3 | CRI or SSBRI #3_1 | CRI or SSBRI #3_2 |
| Codepoint #4 | CRI or SSBRI #4_1 | CRI or SSBRI #4_2 |
| | PHR #1_1 | Differential PHR #1_2 |
| | (Differential) PHR #2_1 | Differential PHR #2_2 |
| | (Differential) PHR #3_1 | Differential PHR #3_2 |
| | (Differential) PHR #4_1 | Differential PHR #4_2 |

At 345, when UE 110 supports simultaneous UL transmissions, system 200 can transmit an indication in the same group beam report used for simultaneous reception of DL transmissions according to the TCI codepoints. As shown in Table 6, the group beam report looks like the Table 2 or Table 3 but with the addition of a column that indicates whether UE 110 can or cannot also simultaneously transmit UL transmissions on the beams associated with the TCI codepoint.

TABLE 6

Shared Group Beam Report

| TCI Codepoint | Beam 1 Identification | Beam 2 Identification | Support Simultaneous Tx |
|---|---|---|---|
| Codepoint #1 | CRI or SSBRI #1_1 | CRI or SSBRI #1_2 | Y/N |
| Codepoint #2 | CRI or SSBRI #2_1 | CRI or SSBRI #2_2 | Y/N |
| Codepoint #3 | CRI or SSBRI #3_1 | CRI or SSBRI #3_2 | Y/N |
| Codepoint #4 | CRI or SSBRI #4_1 | CRI or SSBRI #4_2 | Y/N |
| | SINR/RSRP #1_1 | Differential SINR/RSRP #1_2 | |
| | (Differential) SINR/RSRP #2_1 | Differential SINR/RSRP #2_2 | |
| | (Differential) SINR/RSRP #3_1 | Differential SINR/RSRP #3_2 | |
| | (Differential) SINR/RSRP #4_1 | Differential SINR/RSRP #4_2 | |

At 350, system 200 can transmit to gNB 120 a second indication that identifies two or more sounding reference signals (SRSs) that UE 110 can use for simultaneously transmitting UL transmissions. For example, UE 110 can transmit a report indicating the SRS resource indicator (SRI) pairs for simultaneous UL transmissions. The report can be transmitted via Physical Uplink Control Channel (PUCCH) signaling, Physical Random Access Channel (PRACH) signaling, Radio Resource Control (RRC) signaling, or Media Access Control (MAC) Control Element (CE) signaling. In an example, in response to the report, gNB 120 can create an SRI codepoint that corresponds to two or more SRIs as shown in Table 7 below.

TABLE 7

SRI Codepoint Table

| SRI Codepoint | SRI_1 Identification | SRI_2 Identification |
|---|---|---|
| SRI Codepoint #1 | SRI #1_1 | SRI #1_2 |
| SRI Codepoint #2 | SRI #2_1 | SRI #2_2 |
| . . . | . . . | . . . |
| SRI Codepoint #N | SRI #N_1 | SRI #N_2 |

FIG. 7 illustrates an example MAC-CE indication 700 of Sounding Reference Signal (SRS) Resource Indicator (SRI) codepoints, according to some embodiments of the disclosure. As a convenience and not a limitation, FIG. 7, may be described with elements of previous figures. For example, MAC-CE indication 700 can be generated by gNB 120 of FIG. 1 to UE 110. MAC-CE indication 700 is based on an SRI codepoint corresponding to a pair of SRIs, but more than two SRIs are possible per SRI codepoint. MAC-CE indication 700 includes serving cell ID 715, bandwidth part (BWP) ID 720, a number of SRI codepoints M 730, a number of SRI codepoints with 2 SRIs (#non zero C_i) 740 where C stands for codepoint. As an example, SRI codepoint #0 (C_0) includes SRI (0,1) 750 and SRI (0,2) 760 and so on. SRI codepoint #m (C_M) includes SRI (M-1,1) 770 and SRI (M-1,2) 780.

In some embodiments the SRI codepoint can be used to configure spatial relationships with multiple SRS as reference signals. For example, the SRI codepoint can be used in Downlink Control Information (DCI) 0_1 for PUSCH scheduling.

At 355, system 200 can receive an SRS resource indicator (SRI) codepoint that identifies two or more SRIs that the UE can use for simultaneously transmitting UL transmissions. For example, gNB 120 can generate a SRI codepoint table (e.g., Table 7) and transmit the information via MAC-CE indication 700 to UE 110.

At 360, system 200 can transmit simultaneous UL transmissions via the beams corresponding to a TCI codepoint that includes at least a first and second beam, where a first beam corresponds to a first group of SRS resources and a second beam corresponds to a second group of SRS resources. UE 110 can support simultaneous UL transmission with any beam from each SRS group. An SRS group can be configured at an SRS resource level, an SRS resource set level, and/or an SRS group level where an SRS group explicitly configures a list of SRS resources or resource sets.

Figure 8:
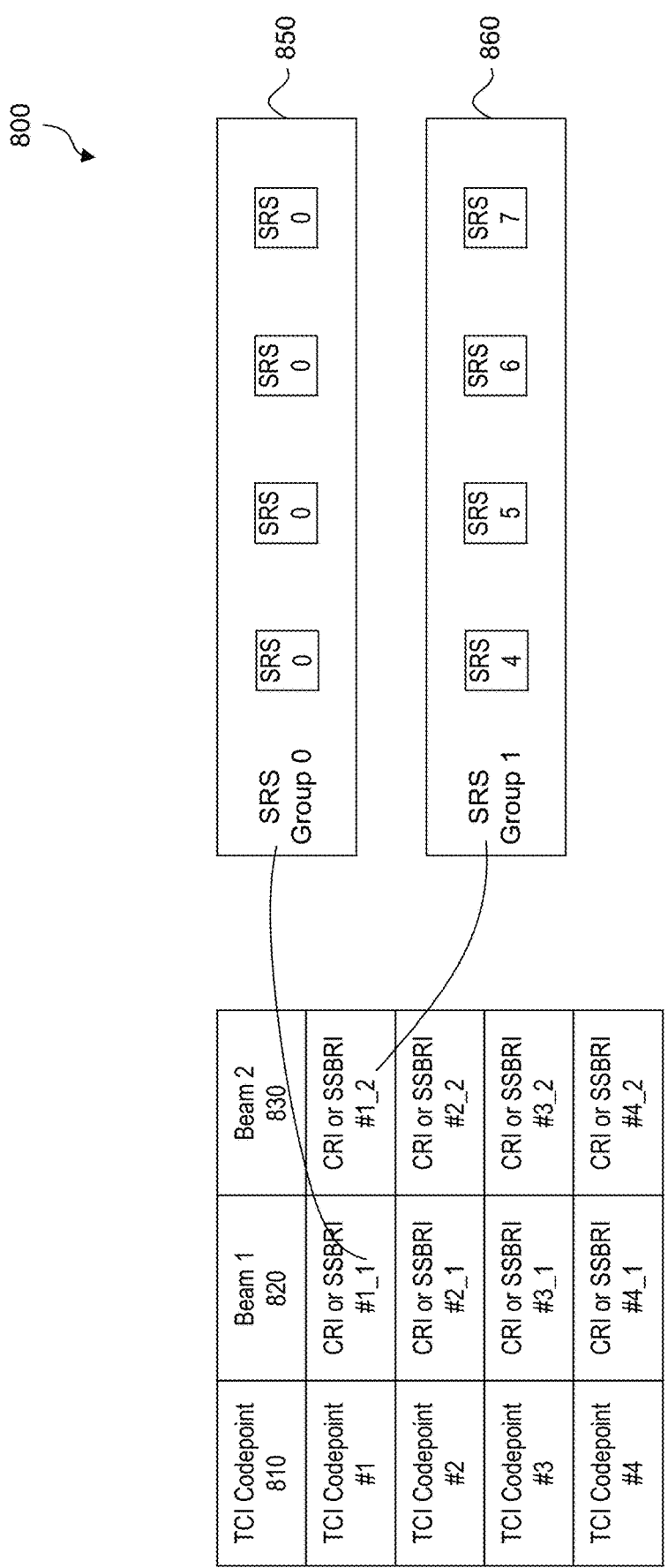
FIG. 8 illustrates an example of transmission configuration indicator (TCI) codepoints and SRS group configurations, according to some embodiments of the disclosure.

FIG. 8 illustrates an example 800 of TCI codepoints and SRS group configurations, according to some embodiments of the disclosure. Example 800 includes a TCI codepoint table (e.g., Table 1) that includes a TCI codepoint 810 column, Beam 1 820 identification column, and Beam 2 830 identification column. Example 800 also includes two SRS groups, SRS Group 0 labelled as 850 and SRS Group 1 labelled as 860. TCI codepoint #1 corresponds to a first beam identified as CRI or SSBRI #1_1 and a second beam identified as CRI or SSBRI #1_2. A spatial relationship is configured by gNB 120 so that UE 110 can transmit simultaneous UL transmissions on the first and second beams that correspond with TCI codepoint #1. SRS Group 0 resources utilize SRS0 to transmit via the first beam and SRS Group 1 resources including SRS4, SRS5, SRS6, and SRS7 to transmit via the second beam.

At 365, system 200 can transmit an indication that the UE is not transmitting simultaneous UL transmissions and/or not receiving simultaneous DL transmissions. In other words, UE 110 can indicate to gNB 120 that UE 110 temporarily stops supporting simultaneous reception on the DL and/or simultaneous transmission on the UL. In some embodiments UE 110 can receive and transmit simultaneously with different analog beams via multiple panels. In some embodiments, UE 110 can put one or more panels into a dormant state for power saving (e.g., to reduce battery power consumption) or for thermal mitigation (e.g., to prevent overheating.) When a panel of the multiple panels is placed in a dormant state, UE 110 can operate in a time division multiplexing (TDM) mode instead of simultaneous receive and/or simultaneous transmit mode. If a subsequent TDM signal is received from gNB 120 that requires the panel placed in the dormant state, UE 110 re-activates the panel according to a beam switching delay, and receives the DL TDM signal.

Figure 5:
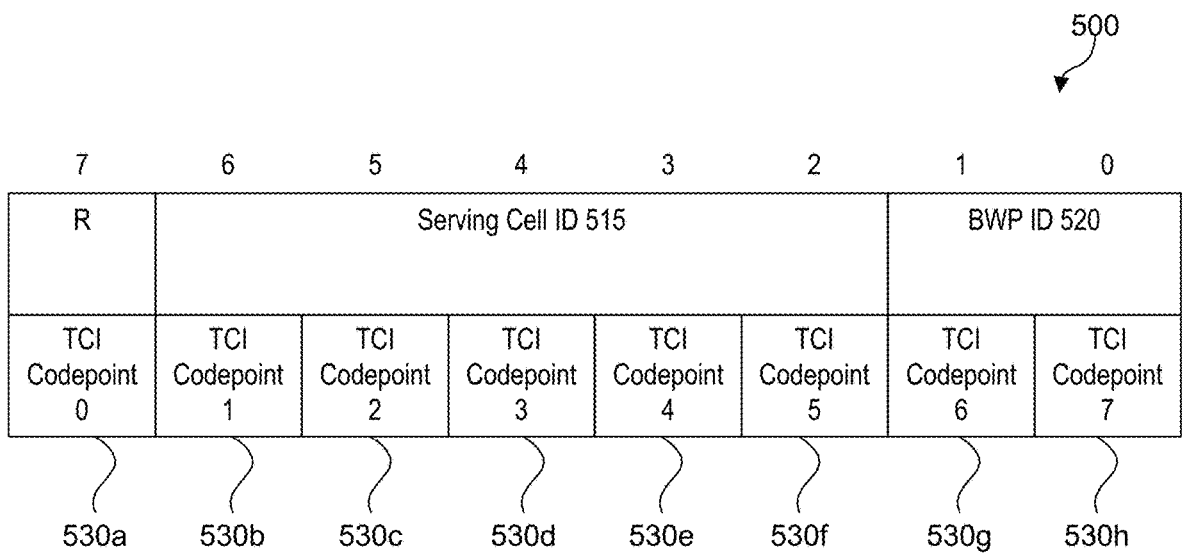
FIG. 5 illustrates an example Media Access Control (MAC)-Control Element (CE) indication of whether a UE can simultaneously receive a downlink (DL) transmission via a certain combination of beams, according to some embodiments of the disclosure.

FIG. 5 illustrates an example MAC-CE indication 500 that indicates whether a UE can simultaneously receive a DL transmission via a certain combination of beams, according to some embodiments of the disclosure. As an example, UE 110 can transmit MAC-CE indication 500 to gNB 120 to temporarily stop simultaneous receptions on DL transmissions that correspond to particular TCI codepoints. MAC-CE indication 500 includes serving cell ID 515, BWP part ID 520, and TCI codepoints 530a-530h that represent a bit mask for 8 TCI codepoints. When UE 110 places a panel corresponding to TCI codepoint 3 labeled as TCI codepoint 530d in a dormant state, UE 110 can transmit MAC-CE indication 500 with TCI codepoint 530d with a value of 0. Thus the beams corresponding to TCI codepoint 530d are not used for simultaneous reception. When UE 110 wants to reinstate simultaneous reception on DL transmissions using the beams associated with TCI codepoint 530d, UE 110 transmits MAC-CE indication 500 with TCI codepoint 530d with a value of 1. Note that gNB 120 can transmit MAC-CE indication 500 to UE 110 to deactivate and re-activate various TCI codepoints as well.

Figure 6:
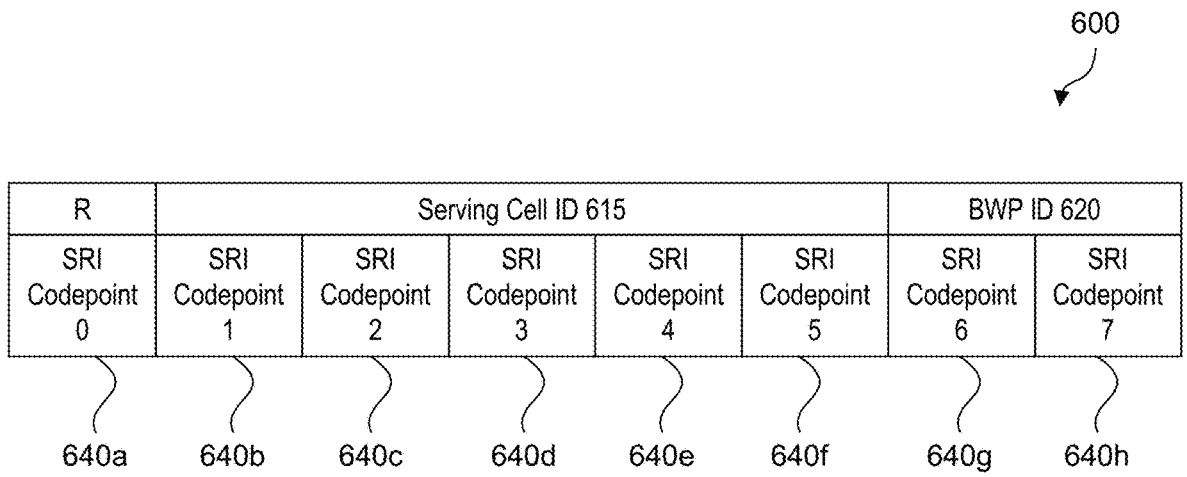
FIG. 6 illustrates an example MAC-CE indication of whether a UE can simultaneously transmit an uplink (UL) transmission via a certain combination of beams, according to some embodiments of the disclosure.

FIG. 6 illustrates an example MAC-CE indication 600 that indicates whether a UE can simultaneously transmit an UL transmission via a certain combination of beams, according to some embodiments of the disclosure. As an example, UE 110 can transmit MAC-CE indication 600 to temporarily stop simultaneous UL transmissions that correspond to particular SRI codepoints. MAC-CE indication 600 includes serving cell ID 615, BWP 620, and SRI codepoints 640a-640h that represent a bit mask for 8 SRI codepoints. To temporarily stop simultaneous UL transmissions associated with SRI codepoint 5 labeled as SRI codepoint 640f, UE 110 transmits MAC-CE indication 600 with SRI codepoint 640f with a value of 0, to gNB 120. To reinstate simultaneous UL transmissions, UE 110 transmits MAC-CE indication 600 to gNB 120 with SRI codepoint 640f with a value of 1. GNB 120 can transmit MAC-CE indication 600 to UE 110 to deactivate or re-activate various SRI codepoints as well.

At 370, system 200 can place one or more panels corresponding to a beam associated with a TCI codepoint into a dormant state. When UE 110 is first powered, UE 110 reports capabilities to gNB 120 and registers to a network (e.g., gNB 120.) FIG. 9 illustrates example 900 of beam switch timing delays, according to some embodiments of the disclosure. The reporting of UE 110 capabilities to gNB 120 can include beamSwitchTiming 910 and/or timeDurationForQCL 920 as shown in FIG. 9, for example. UE 110 can operate in TDM mode. When UE 110 receives a TDM signal from gNB 120 that is directed to the dormant panel, UE 110 can re-activate the panel according to the beam switch timing delay or time duration for Quasi-Colocation (QCL) as shown in FIG. 9. The beam switch timing delay can be a largest value of beamSwitchTiming 910 and/or timeDurationForQCL 920. UE 110 can re-activate the panel and receive the TDM signal via the re-activated panel.

Figure 4:
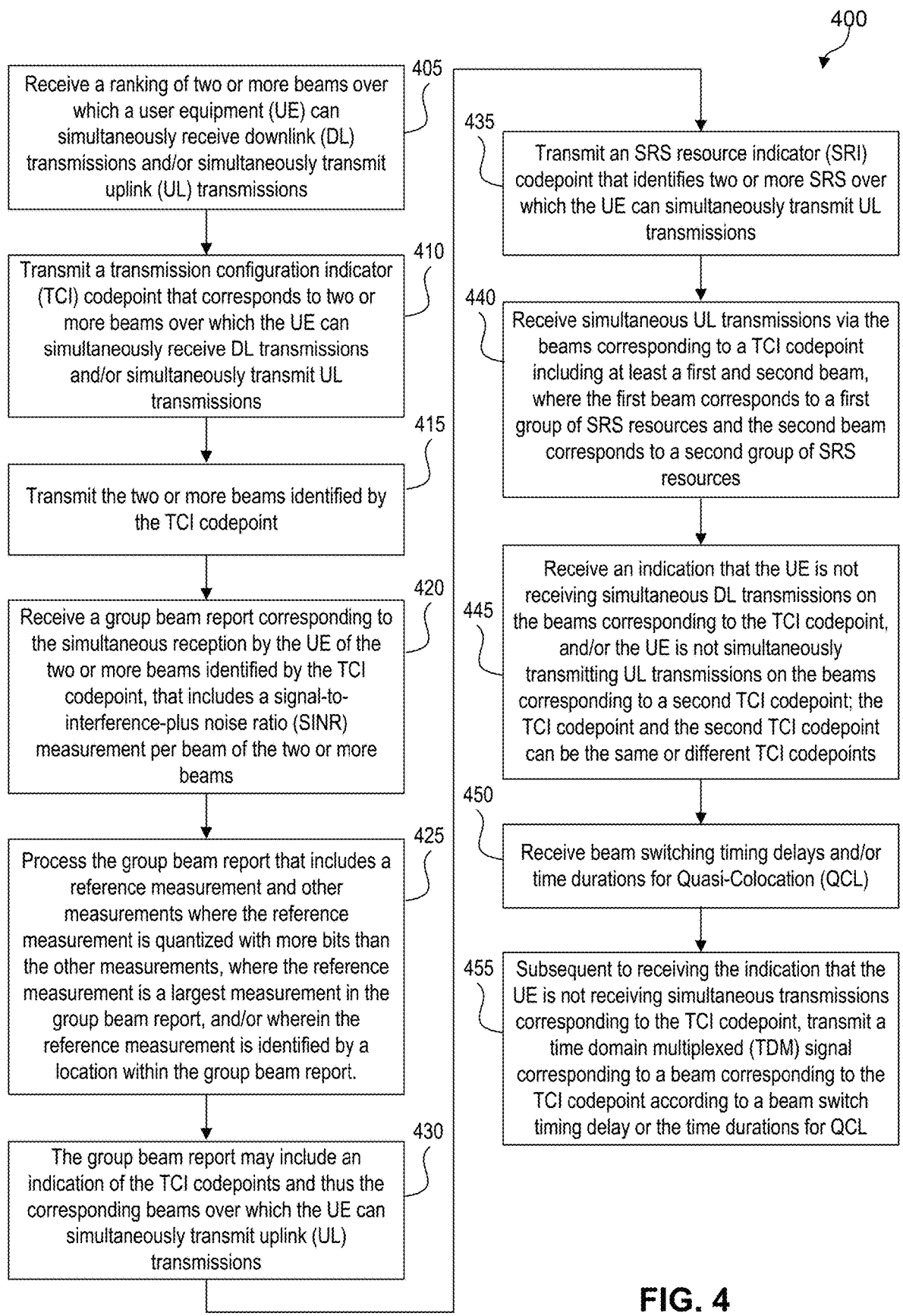
FIG. 4 illustrates a method for an example 5G Node B (gNB) for group based reporting beam management, according to some embodiments of the disclosure.

FIG. 4 illustrates a method 400 for an example 5G Node B (gNB) for group based reporting beam management, according to some embodiments of the disclosure. As a convenience and not a limitation, FIG. 4, may be described with elements of previous figures. For example, method 400 may be performed by gNB 120 of FIG. 1 or system 200 of FIG. 2.

At 405, system 200 can receive a ranking of two or more beams over which a user equipment (UE) can simultaneously receive DL transmissions and/or simultaneously transmit UL transmissions. For example, gNB 120 can receive a ranking of combinations of beams from UE 110 over which UE 110 can simultaneously receive DL transmissions and/or simultaneously transmit UL transmissions.

At 410, system 200 can transmit a TCI codepoint that corresponds to two or more beams from which the UE can simultaneously receive DL transmissions and/or simultaneously transmit UL transmissions. For example, gNB 120 can transmit a TCI codepoint table (e.g., Table 1) to UE 110.

At 415, system 200 can transmit the two or more beams identified by the TCI codepoint. For example, gNB 120 can transmit combinations of beams corresponding to TCI codepoints of the TCI codepoint table for UE to simultaneously receive DL transmissions and/or simultaneously transmit UL transmissions.

At 420, system 200 can receive a group beam report corresponding to the simultaneous reception by the UE of the two or more beams identified by the TCI codepoint, that includes a SINR measurement per beam of the two or more beams (e.g., Table 2.) In some embodiments the group report includes RSRP measurements and/or a combination of SINR and RSRP measurements.

At 425, system 200 can process the group beam report that includes a reference measurement and other measurements where the reference measurement is quantized with more bits than the other measurements, where the reference measurement is a largest measurement in the group beam report, and/or where the reference measurement is identified by a location within the group beam report (e.g., Table 2 and/or Table 3.)

At 430, the group beam report may include an indication of the TCI codepoints and thus the corresponding beams over which the UE can simultaneously transmit uplink (UL) transmissions (e.g., Table 6.)

At 435, system 200 can transmit an SRI codepoint that identifies two or more SRIs over which the UE can simultaneously transmit UL transmissions. For example, gNB 120 can generate and transmit Table 7 to UE 110.

At 440, system 200 can receive simultaneous UL transmissions via the beams corresponding to a TCI codepoint including at least a first and second beam, where the first beam corresponds to a first group of SRS resources and the second beam corresponds to a second group of SRS resources. For example, gNB 120 can generate MAC-CE indication 700 of FIG. 7 and transmit to UE 110, where the simultaneous UL transmissions received from UE 110 correspond to MAC-CE indication 700.

At 445, system 200 can receive an indication that the UE is not simultaneously receiving DL transmissions on the beams corresponding to the TCI codepoint, and/or the UE is not simultaneously transmitting UL transmissions on the beams corresponding to a second TCI codepoint; the TCI codepoint and the second TCI codepoint can be the same or different TCI codepoints. For example, gNB 120 can receive MAC-CE indication 500 of FIG. 5 and/or MAC-CE indication 600 of FIG. 6. GNB 120 can also transmit MAC-CE indication 500 and/or MAC-CE indication 600 to UE 110.

At 450, system 200 can receive beam switch timing delays and/or time durations for Quasi-Colocation (QCL), according to UE 110 report configurations. These may have been received earlier (e.g., when UE 110 powered up.)

At 455, subsequent to receiving the indication that the UE is not receiving simultaneous DL transmissions corresponding to the TCI codepoint, system 200 can transmit a TDM signal corresponding to a beam corresponding to the TCI codepoint. The TDM signal can be transmitted according to a beam switch timing delay or the time durations for QCL. For example, after receiving MAC-CE indication 500 that a given TCI codepoint is inactive, gNB 120 can switch to TDM mode, wait for a beam switch timing delay as shown in FIG. 9 according to report configuration information received from UE 110, and then transmit a TDM signal corresponding to the inactive TCI codepoint to UE 110.

Figure 10:
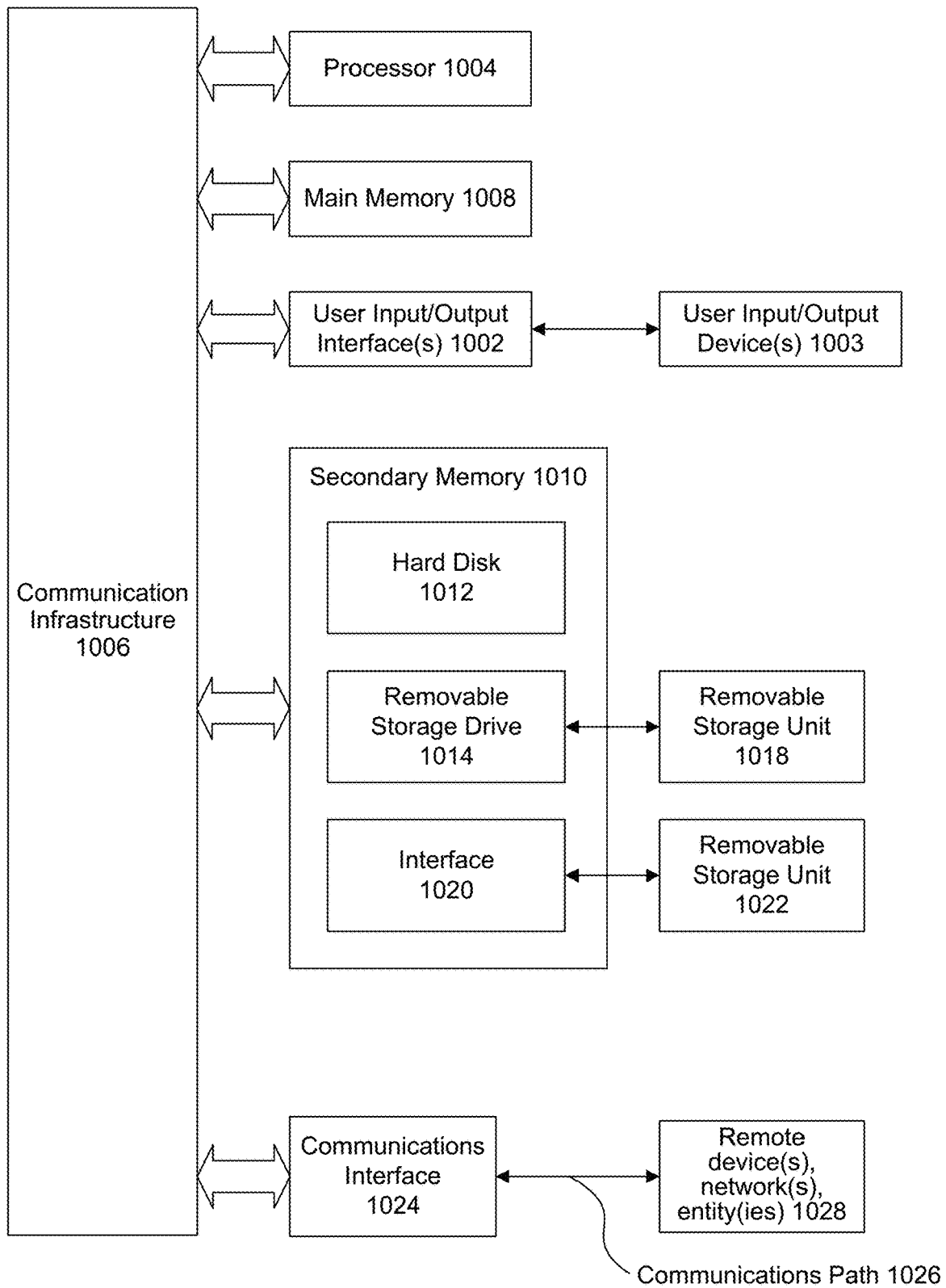
FIG. 10 is an example computer system for implementing some embodiments or portion(s) thereof.

Various embodiments can be implemented, for example, using one or more well-known computer systems, such as computer system 1000 shown in FIG. 10. Computer system 1000 can be any well-known computer capable of performing the functions described herein. For example, and without limitation, system 200 of FIG. 2, method 300 of FIG. 3, and method 400 of FIG. 4 (and/or other apparatuses and/or components shown in the figures) may be implemented using computer system 1000, or portions thereof.

Computer system 1000 includes one or more processors (also called central processing units, or CPUs), such as a processor 1004. Processor 1004 is connected to a communication infrastructure or bus 1006. One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some embodiments, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A user equipment (UE), comprising:
 a transceiver configured to transmit and receive wireless communications;
 a processor, coupled to the transceiver, configured to:
  transmit, to a base station (BS) via the transceiver, a ranking of a plurality of beams from which the UE can simultaneously receive downlink (DL) transmissions;
  based at least on the ranking, receive via the transceiver, a transmission configuration indicator (TCI) codepoint that corresponds to two or more beams from which the UE can simultaneously receive DL transmissions, wherein a beam of the two or more beams is identified by a channel-state information (CSI) resource indicator (CRI), a synchronization signal block resource indicator (SSBRI), or a sounding reference signal (SRS) resource indicator (SRI);
  simultaneously receive, via the transceiver, the two or more beams identified by the TCI codepoint; and
  transmit, via the transceiver, a group beam report corresponding to the simultaneous reception, the group beam report comprising the TCI codepoint and a signal-to-interference-plus noise ratio (SINR) measurement per beam of the two or more beams,
  wherein a first SINR measurement of the two or more beams is encoded as a reference measurement in the group beam report, and a second SINR measurement of the two or more beams comprises a differential measurement from the reference measurement.

2. The UE of claim 1, wherein the processor is further configured to:
 determine a SINR measurement or a reference signal received power (RSRP) measurement per beam of the plurality of beams; and
 rank, based at least on the determined SINR measurements or the determined RSRP measurements, a first combination of two or more beams of the plurality of beams with a second combination of two or more beams of the plurality of beams.

3. The UE of claim 1, wherein the processor is further configured to:
 quantize the first SINR measurement of the two or more beams as the reference measurement using X bits, where X is an integer; and
 quantize the second SINR measurement of the two or more beams using Y bits, where Y is an integer less than X.

4. The UE of claim 3, wherein the reference measurement is larger than other measurements in the group beam report, and wherein the reference measurement is identified by a location within the group beam report.

5. The UE of claim 1, wherein the processor is further configured to:
 determine that the LIE supports simultaneous uplink (UL) transmissions; and
 transmit the group beam report including an indication of whether the UE supports simultaneous UL transmissions on the two or more beams corresponding to the TCI codepoint.

6. The UE of claim 5, wherein the processor is further configured to: transmit, to the BS via the transceiver, a second indication of two or more SRSs over which the UE can simultaneously transmit UL, transmissions, wherein the second indication comprises: Physical Uplink Control Channel (PUCCH) signaling, Physical Random Access Channel (PRACH) signaling, Radio Resource Control (RRC) signaling, or Media Access Control (MAC) Control Element (CE) signaling.

7. The UE of claim 6, wherein the processor is further configured to: based at least on the second indication, receive, via the transceiver, an SRI codepoint that identifies a spatial relationship with or more SRIs with which the UE can simultaneously transmit UL transmissions.

8. The UE of claim 6, wherein the processor is further configured to: transmit, to the BS via the transceiver, simultaneous UL transmissions via the two or more beams corresponding to the TCI codepoint, wherein a first beam of the two or more beams corresponds to a first group of SRS resources and a second beam of the two or more beams corresponds to a second group of SRS resources.

9. The UE of claim 5, wherein the processor is further configured to: transmit, to the BS via the transceiver, a second indication that the UE is not transmitting simultaneous UL transmissions on the two or more beams corresponding to the TCI codepoint.

10. The UE of claim 5, wherein the UE is configured to simultaneously transmit UL transmissions on the two or more beams corresponding to the TCI codepoint, the processor is further configured to transmit, to the BS via the transceiver, a second group beam report, that comprises a power headroom (PHR) value.

11. The UE of claim 1, further comprising:
an antenna, coupled to the transceiver, comprising two or more panels, wherein processor is configured to:
transmit, to the BS via the transceiver, an indication that the UE is not receiving simultaneous DL transmissions on the two or more beams corresponding to the TCI codepoint; and
place a panel of the two or more panels corresponding to a beam of the two or more beams in a dormant state.

12. The UE of claim 11, wherein the indication comprises: Physical Uplink Control Channel (PUCCH) signaling, Physical Random Access Channel (PRACH) signaling, Radio Resource Control (RRC) signaling, or Media Access Control (MAC) Control Element (CE) signaling.

13. The UE of claim 11, wherein the processor is further configured to:
transmit, via the transceiver, report capabilities comprising beam switch timing delays;
subsequent to placing the panel of the two or more panels in the dormant state, re-activate the panel according to a largest beam switch timing delay of the beam switch timing delays; and
receive, via the transceiver and the panel, a time domain multiplexed (TDM) signal corresponding to the panel.

14. A base station (BS) comprising:
a transceiver configured to transmit and receive wireless communications;
a processor, coupled to the transceiver, configured to:
receive, from a user equipment (UE) via the transceiver, a ranking of a plurality, of beams from which the UE can simultaneously receive downlink (DL) transmissions;
based at least on the ranking, transmit via the transceiver, a first transmission configuration indicator (TCI) codepoint that corresponds to a first set of two or more beams from which the UE can simultaneously receive DL transmissions, wherein a beam of the first set of two or more beams is identified by a channel-state information (CSI) resource indicator (CRI), a synchronization signal block resource indicator (SSBRI), or a sounding reference signal (SRS) resource indicator (SRI);
transmit, via the transceiver, the first set of two or more beams identified by the first TCI codepoint; and
receive, via the transceiver, a group beam report corresponding to a simultaneous reception by the UE of the first set of two or more beams, the group beam report comprising the first TCI codepoint and a signal-to-interference-plus noise ratio (SINR) measurement per beam of the first set of two or more beams,
wherein a first SINR measurement of the first set of two or more beams is encoded as a reference measurement in the group beam report, and a second SINR measurement of the first set of two or more beams comprises a differential measurement from the reference measurement.

15. The BS of claim 14, wherein the ranking is based at least on the SINR measurement or a reference signal received power (RSRP) measurement of the plurality of beams.

16. The BS of claim 14, wherein the processor is further configured to:
process the group beam report that comprises:
the reference measurement that includes a quantized first SINR measurement of the two or more beams using X bits, where X is an integer, and a second quantized SINR measurement of the first set of two or more beams comprising Y bits, where Y is an integer less than X,
wherein the reference measurement is larger than other measurements in the group beam report, or
wherein the reference measurement is identified by a location within the group beam report.

17. The BS of claim 14, wherein the group beam report indicates that the UE can simultaneously transmit uplink (UL) transmissions via a second set of two or more beams corresponding to a second TCI codepoint, and wherein the second TCI codepoint is different than the first TCI codepoint.

18. The BS of claim 17, wherein the processor is further configured to: receive, from the UE via the transceiver, an indication that the UE is not receiving simultaneous DL transmissions on the first set of two or more beams corresponding to the first TCI codepoint, wherein the indication comprises: Physical Uplink Control Channel (PUCCH) signaling, Physical Random Access Channel (PRACH) signaling, Radio Resource Control (RRC) signaling, or Media Access Control (MAC) Control Element (CE) signaling.

19. The BS of claim 14, wherein the processor is further configured to:
receive, via the transceiver, report capabilities comprising beam switch timing delays; and
subsequent to receiving the indication, transmit, via a transceiver, a time domain multiplexed (TDM) signal corresponding to a beam of the first set of two or more beams according to a largest beam switch timing delay of the beam switch timing delays.

20. A method for a user equipment (UE) comprising:
transmitting, to a base station (BS) via a transceiver, a ranking of a plurality of beams from which the UE can simultaneously receive downlink (DL) transmissions;
based at least on the ranking, receiving, via the transceiver, a first transmission configuration indicator (TCI) codepoint that corresponds to a first set of two or more beams from which the UE can simultaneously receive DL transmissions, and a second TCI codepoint that corresponds to a second set of two or more beams from which the UE can simultaneously transmit uplink (UL) transmissions;

simultaneously receiving DL transmissions from the first set of two or more beams identified by the first TCI codepoint;

simultaneously transmitting UL transmissions via the second set of two or more beams identified by the second TCI codepoint, wherein the second TCI codepoint is different than the first TCI codepoint; and transmitting a group beam report corresponding to the simultaneous reception, the group beam report comprising the first TCI codepoint and a signal-to-interference-plus noise ratio (SINR) measurement per beam of the first set of two or more beams, wherein a first SINR measurement of the first set of two or more beams is encoded as a reference measurement in the group beam report, and a second SINR measurement of the first set of two or more beams comprises a differential measurement from the reference measurement.

* * * * *